United States Patent
Soroushi et al.

(10) Patent No.: US 7,221,378 B2
(45) Date of Patent: May 22, 2007

(54) MEMORY EFFICIENT METHOD AND APPARATUS FOR DISPLAYING LARGE OVERLAID CAMERA IMAGES

(75) Inventors: Atousa Soroushi, North Vancouver (CA); Victor Ga-Kui Chan, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 98 days.

(21) Appl. No.: 10/802,578

(22) Filed: Mar. 17, 2004

(65) Prior Publication Data

US 2005/0206652 A1    Sep. 22, 2005

(51) Int. Cl.
*G06T 11/00* (2006.01)
(52) U.S. Cl. .................................... 345/629
(58) Field of Classification Search ................. 345/629
See application file for complete search history.

(56) References Cited

U.S. PATENT DOCUMENTS

| 5,099,331 | A | 3/1992 | Truong |
| 5,258,843 | A | 11/1993 | Truong |
| 5,477,264 | A | 12/1995 | Sarbadhikari et al. |
| 5,594,507 | A | 1/1997 | Hoarty |
| 5,717,454 | A | 2/1998 | Adolphi et al. |
| 5,903,261 | A | 5/1999 | Walsh et al. |
| 5,940,089 | A | 8/1999 | Dilliplane et al. |
| 6,396,473 | B1 | 5/2002 | Callahan et al. |
| 6,504,575 | B1 | 1/2003 | Ramirez et al. |
| 6,570,581 | B1 | 5/2003 | Smith |
| 2002/0024603 | A1 | 2/2002 | Nakayama et al. |
| 2004/0119726 | A1* | 6/2004 | Li ................................ 345/629 |

OTHER PUBLICATIONS

PackBits, Wikipidia, Apr. 26, 2005, http://en.wikipedia.org/wiki/PackBits.

* cited by examiner

*Primary Examiner*—Almis R. Jankus
(74) *Attorney, Agent, or Firm*—Mark P. Watson

(57) ABSTRACT

A memory efficient method and apparatus for displaying large overlaid camera images. According to one aspect of the invention, overlay image data are stored in a memory, fetched, up-scaled, and then combined with main image data to form composite image data for rendering on a graphics display device. According to another aspect of the invention, the overlay image data are stored in a memory, fetched, and then combined with main image data streamed from a source of the main image data.

77 Claims, 4 Drawing Sheets

MEMORY EFFICIENT METHOD AND APPARATUS FOR DISPLAYING LARGE OVERLAID CAMERA IMAGES

This invention relates to a memory efficient method and apparatus for displaying large overlaid camera images, particularly for use in an electronic computing device such as a cellular telephone.

BACKGROUND

It is common in electronic computing systems or devices having graphics displays, such as cell phones, to overlay one image on top of another. Typically, the main, or underlying image is covered by the overlay image so that, where the main and overlay images overlap, the main image is not visible. One particular example of overlaying occurs where it is desired to provide a picture frame or border around an image. Similarly, other geometric shapes or text may be superimposed over an image.

In such applications, the overlay image defines pixels that are transparent and pixels that are not transparent, or opaque. Where the overlay image is transparent, the underlying main image is visible, and where the overlay image is opaque, only the overlay image is visible. Pixels in the overlay image can be defined as being transparent or opaque by the use of appropriate coding. For example, particular colors can be defined as being transparent while other colors can be defined as being opaque.

In many cell phones, the main image is produced by a camera. A graphics controller includes a camera interface for interfacing to the camera. The graphics controller resizes the camera data and converts the camera data from YUV to RGB color format for storage in an on-board display buffer. The graphics controller also receives an overlay image from a host CPU and stores the overlay image data in the display buffer as well. The overlay image and the main image may or may not be the same size.

The graphics controller fetches a main image pixel and a corresponding overlay image pixel from the display buffer and combines the two pixels. This sequence is performed for every pixel in the main image, to form composite image data The composite image data are provided to an interface for interfacing to a display device.

One problem with the methodology described above is that it requires a significant amount of memory, because both images are stored in the display buffer. This problem is exacerbated if the overlay image is the same size as the main image, so that twice the amount of memory required for the main image is required for the composite. Another problem with the methodology is that a main image which is too large to fit within the display buffer cannot be displayed.

Accordingly, there is a need for a memory efficient method and apparatus for displaying large overlaid camera images that solves these problems.

SUMMARY

A memory efficient method and apparatus for displaying large overlaid camera images according to the invention combines main image data and overlay image data to form composite image data for rendering on a graphics display device. According to one aspect of the invention, the overlay image data are stored in a memory, fetched, up-scaled, and then combined with the main image data to form the composite image data. According to another aspect of the invention, the overlay image data are stored in a memory, fetched, and then combined with main image data streamed from a source of the main image data.

DETAILED DESCRIPTION OF PREFERRED EMBODIMENTS

Figure 1:
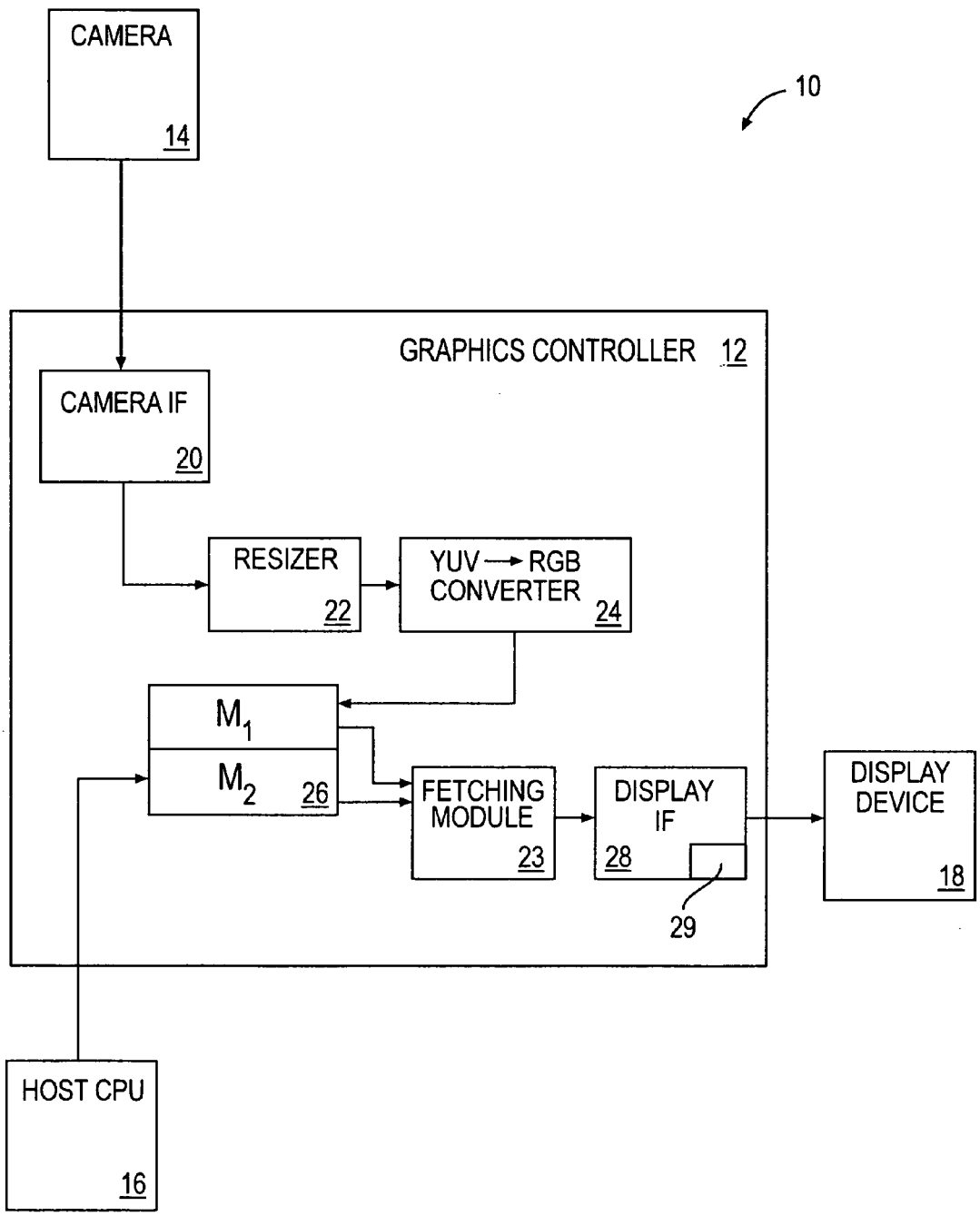
FIG. 1 is block diagram of a prior art electronic computing system.

FIG. 1 shows a prior art electronic computing system 10 for comparison with systems described herein according to the present invention. The system 10 includes a graphics controller 12 that interfaces to (a) a camera 14, (b) a host CPU 16, and (c) a graphics display device 18 such as an LCD panel. The graphics controller manages image data streaming from the camera and the CPU so as to combine the image data into a composite, and provides the composite data to the graphics display device.

The composite image is particularly a main image overlaid with an overlay image. Main image data defining the main image is provided by the camera 14, and overlay image data defining the overlay image is provided by the CPU 16. The overlay image data function as a template through which the main image data are to be viewed.

Main image data obtained from the camera are received by the camera interface (IF) 20. The received data are provided to a resizer 22 and, in turn, a color format converter 24 for converting the (typically) YUV camera output to RGB format for storage in a first memory portion "$M_1$" of a display buffer 26. Other color conversions may also be performed, and these functions can be performed in alternative sequences.

The graphics controller 12 stores overlay image data received from the host CPU 16 directly to a second memory portion "$M_2$" of the display buffer 26, separate from the first portion. The graphics controller includes a fetching module 23 for fetching, pixel by pixel, each of the main image data and the corresponding overlay image data from the display buffer 26. The fetched data are provided to a graphics display interface 28. The graphics display interface includes a combining circuit 29 for forming a composite image from the main and overlay image data The graphics display interface transmits the composite image to the graphics display device for display.

The interface 28 receives, for each pixel location on the display, a main image pixel and an overlay image pixel. Where the overlay image pixel is transparent, the combining circuit 29 selects the main image pixel for the composite image. Where the overlay image pixel is opaque, the combining circuit selects the overlay image pixel for the composite image.

Figure 2:
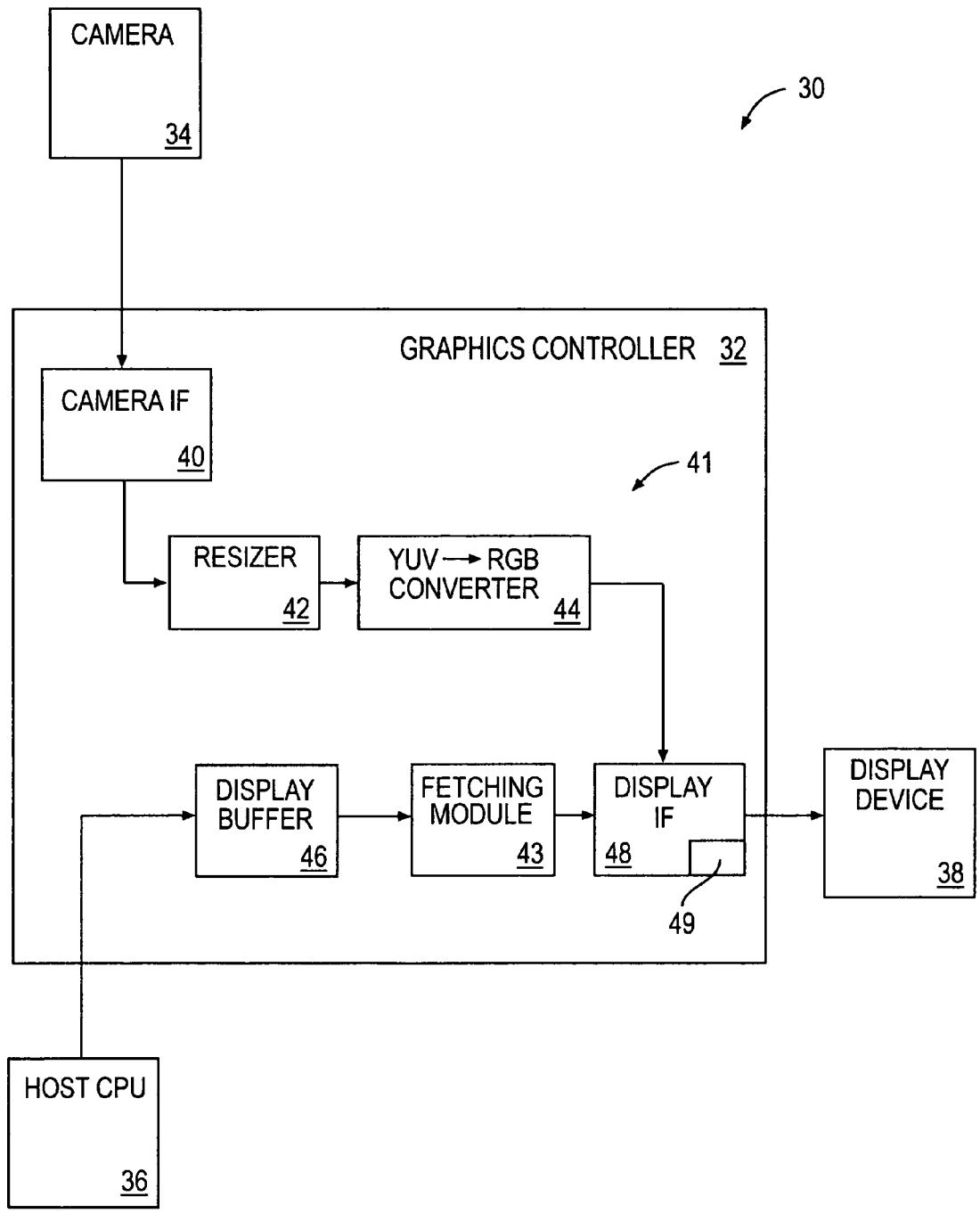
FIG. 2 is a block diagram of an electronic computing system for displaying overlaid camera images according to the present invention.

Turning to FIG. 2, an electronic computing system 30 for displaying overlaid camera images according to the present invention is shown. Like the system 10, the system 30 includes a graphics controller 32 that interfaces to a camera 34, a host CPU 36, and a graphics display device 38. In the context of the present invention, a graphics display device may be any device adapted for rendering image data. A preferred graphics display device is an LCD panel, but the graphics display device may be, for example, a CRT, plasma display, OLED, printer, or equivalent device.

As in the graphics controller 12 of the system 10, an objective of the system 30 is to form a composite image from a main image and an overlay image. In the preferred cell phone context of the invention, the overlay image data are generated or stored in the CPU 36 while the main image data are generated by the camera 34; however, any source of graphics output may be used to produce either type of image data without departing from the principles of the invention.

Also as in the graphics controller 12, main image data obtained from the camera are received by a camera interface (IF) 40. The received data are streamed through a transmitting pipe 41 to a graphics display interface 48 for interfacing to the graphics display device 38. The transmitting pipe 41 typically includes processing units such as a resizer 42 and a color format converter 44 as in the controller 12; however, such processing units are not essential to the invention.

The graphics controller 32 stores overlay image data received from the host CPU 36 in an internal display buffer 46. However, in contradistinction to the graphics controller 12 and in accordance with principles of the present invention, the main image data are transmitted by the transmitting pipe 41 from the camera interface 40 to the graphics display interface 48 without fetching the data as in the prior art. Such transmitting is referred to herein as "streaming." For example, the aforementioned processing units receive ordered pixel data, so that there is no need to address a memory to obtain the pixel data Accordingly, to perform streaming according to the present invention, the transmitting pipe 41 does not require a fetching module.

The graphics controller includes a fetching module 43 for fetching overlay image pixels from the display buffer 46 and provides the overlay image pixels to the interface 48 as corresponding main image pixels are streamed from the color converter 44 to the interface 48. A composite image is formed at the interface using a combining circuit 49 that is the same as or similar to that described above in connection with the graphics controller 12. However, because the main image data are not stored, e.g., in the display buffer 46, the display buffer can be smaller, providing a commensurate reduction in power consumption and increased speed of operation.

The main image data correspond to main image pixels and the overlay image data correspond to overlay image pixels. The display interface 48 includes a counter for counting the main image pixels corresponding to main image data received from the transmitting pipe 41 and communicates with the fetching module 43 so as to fetch the corresponding overlay image pixel from the overlay image data stored in the display buffer 46. Synchronization of the main and overlay image pixels may be accomplished by any means known in the art as will be readily appreciated by persons of ordinary skill.

The graphics display interface 48 typically transmits the composite image to the graphics display device for display; however, this not essential.

Streaming the main image data within the graphics controller 32 from the camera interface 40 to the graphics display interface 48 for combining with the overlay image for provision of the composite data to the graphics display device is generally practical only if the data meet the timing requirements of the graphics display device. That is, a timing adaptation would typically be required if the graphics display device does not have its own memory. However, in the preferred cell phone context of the invention as well as in other contexts, LCD panels are now being provided with internal RAM (38$a$). Accordingly, the main image data can be provided to the panels, where the data are written to the internal RAM, so that the panels can read the data from the internal RAM with the appropriate timing.

Figure 3:
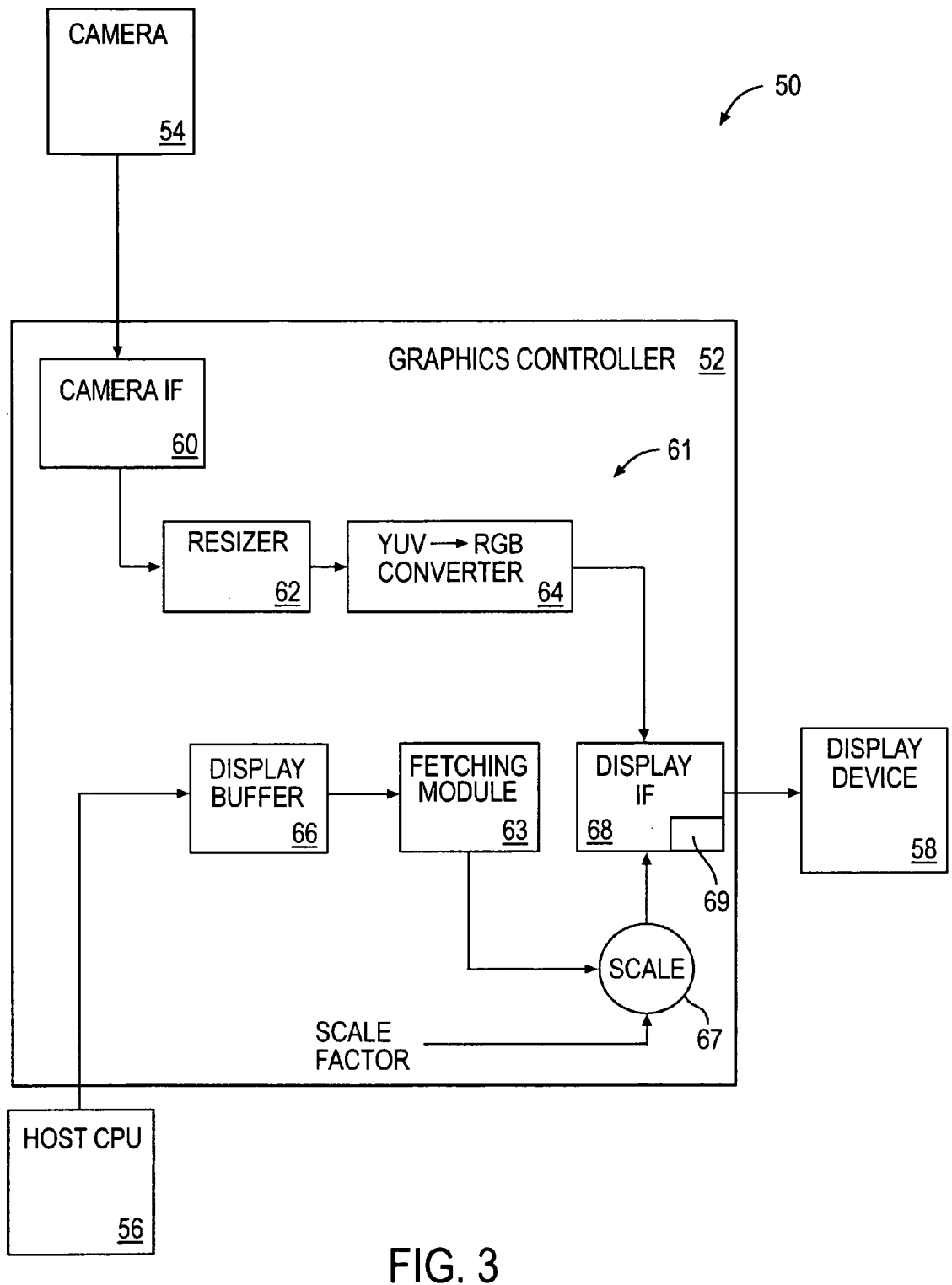
FIG. 3 is a block diagram of an alternative electronic computing system for displaying large overlaid camera images according to the present invention.

Turning now to FIG. 3, an enhanced electronic computing system 50 according to the present invention that is particularly advantageous for displaying large overlaid camera images is shown. Like the system 30, the system 50 includes a graphics controller 52 that interfaces to a camera 54, a host CPU 56, and a graphics display device 58.

As for the system 30, in the preferred cell phone context of the invention, the overlay image data are generated or stored in the CPU 56 while the main image data are generated by the camera 54; however, any source of graphics output may be used to produce either type of image data without departing from the principles of the invention.

As in the graphics controller 32, main image data obtained from the camera are received by the camera interface (IF) 60 and streamed through a transmitting pipe 61 to a graphics display interface 68 provided for interfacing to the graphics display device 58. The transmitting pipe 61 typically includes processing units such as a resizer 62 and a color format converter 64, however, such processing units are not essential to the invention.

Also as in the graphics controller 32, overlay image data received from the host CPU 56 are stored in the graphics controller 52 in an internal display buffer 56. However, according to principles of the invention, it is recognized that the resolution of the overlay image data is not critical, since they represent artificial features, such as borders or text, that typically do not have or require a high resolution. In accord with this recognition, the overlay image according to the invention is provided as a scaled down version of the desired overlay image as displayed on the display device. This permits a further reduction in the size of the display buffer and the performance consequences thereof.

Accordingly, a fetching module 63 fetches the scaled down overlay image data from the display buffer 66 and the fetched data are provided to an scaling circuit 67 that up-scales the overlay image data before providing the overlay image data to the graphics display interface 68. The amount that the overlay image data are down-scaled for storage is typically known in advance and the scaling circuit 67, in up-scaling the overlay image data, restores the overlay image data to full size with reference to a suitable scale factor. Subsequently, as in the graphics controller 32, a composite (main+overlay) image is formed at the interface using a combining circuit 69 that is the same as or similar to that described above in connection with the graphics controller 12. The graphics display interface 68 typically transmits the composite image to the graphics display device for display; however, this not essential.

Figure 4:
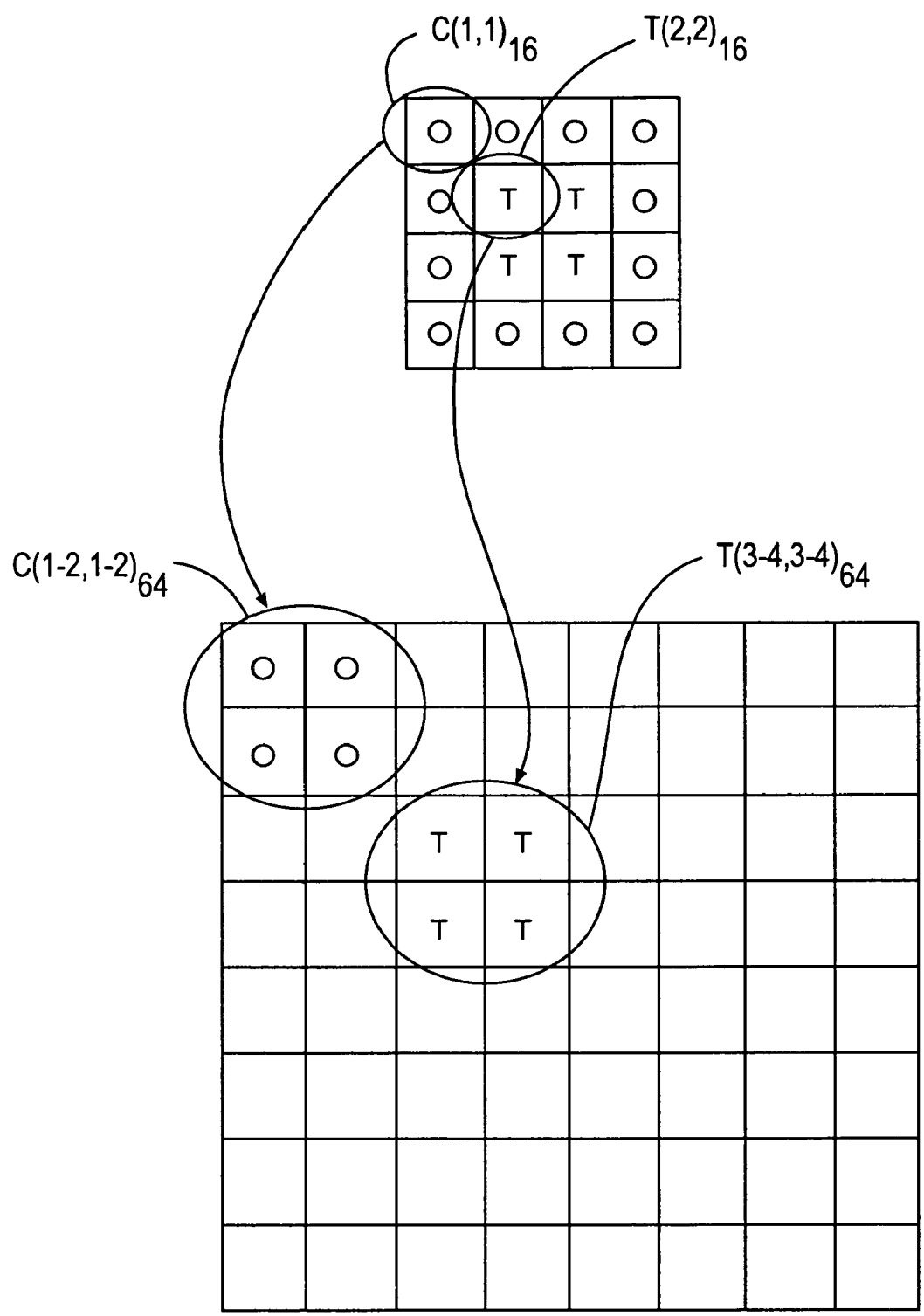
FIG. 4 is a schematic representation of up-scaling downscaled overlay image data according to the present invention.

FIG. 4 shows an example of a border defining, for illustrative purposes only, a 16 pixel scaled down overlay image of a border comprising 12 border pixels that are opaque ("O") and 4 interior pixels that are transparent ("T"). The 16 pixel scaled down overlay image scales up in this example to a 64 pixel image. Particularly, a single corner pixel $C(1,1)_{16}$ is expanded by up-scaling to become the group of 4 pixels indicated as $C(1\text{-}2, 1\text{-}2)_{64}$ and a single interior pixel "$T(2,2)_{16}$" is expanded to become the group of pixels indicated as $C(3\text{-}4, 3\text{-}4)_{64}$. In this example and as is typical, it can be readily appreciated that no loss of resolution occurs as a result of the scaling. It will also be appreciated that scaling may be by any known method, e.g., any integral or fractional zoom.

As noted above, the system 50 is particularly advantageous where the overlay image is large, and may even be necessary where the overlay image is larger than the main image. However, the system 50 provides a similar advantage for displaying overlay images that are the same size as, or that are smaller than, the corresponding main image. Additional processing may be performed on the composite image data without departing from the principles of the invention.

It should be recognized that, while specific memory efficient methods and apparatus for displaying large overlaid camera images have been shown and described as preferred, other configurations and methods could be utilized, in addition to those already mentioned, without departing from the principles of the invention. For example, wherever it is desired, overlay image data may be substituted for main image data and the reverse.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims that follow.

The invention claimed is:

1. A method for overlaying overlay image data received from an overlay image source over main image data received from a main image source, comprising:
   storing the overlay image data in a memory;
   fetching the overlay image data from the memory;
   up-scaling the fetched overlay image data according to a methodology that changes at least one dimension of an image; and
   combining the fetched, up-scaled overlay image data with the main image data to form composite image data.

2. The method of claim 1, further comprising downscaling the overlay image data according to the methodology that changes at least one dimension of an image prior to said step of storing.

3. The method of claim 1, where the up-scaled overlay image data and the main image data define corresponding overlay image pixels and main image pixels respectively, wherein said overlay image pixels are either transparent or opaque, and wherein said step of combining includes
   (a) selecting said overlay image pixels and not the corresponding said main image pixels where said overlay image pixels are opaque, and
   (b) selecting said main image pixels and not the corresponding said overlay image pixels where said overlay image pixels are transparent.

4. The method of claim 1, further comprising resizing the main image data prior to said step of combining.

5. The method of claim 1, further comprising converting the main image data from one color format to another color format prior to said step of combining.

6. The method of claim 5, further comprising resizing the main image data prior to said step of combining.

7. The method of claim 6, further comprising transmitting said composite image data to a display device having a display screen.

8. The method of claim 7, further comprising storing the transmitted said composite image data in a memory in said display device.

9. The method of claim 1, further comprising transmitting said composite image data to a display device having a display screen.

10. The method of claim 9, further comprising storing the transmitted said composite image data in a memory in said display device.

11. A method for overlaying overlay image data received from an overlay image source over main image data received from a main image source, comprising:
    storing the overlay image data in a memory;
    streaming the main image data from the main image source according to a streaming process that continuously transmits all of the main image data at a particular rate;
    receiving the main image data;
    fetching the overlay image data from the memory synchronously with the receiving of the main image data; and
    combining the fetched overlay image data with the streamed main image data as the main image data is received to form composite image data.

12. The method of claim 11, further comprising up-scaling the fetched overlay image data according to a methodology that changes at least one dimension of an image prior to the step of combining.

13. The method of claim 12, further comprising downscaling the overlay image data according to the methodology that changes at least one dimension of an image prior to the step of storing.

14. The method of claim 12, where the up-scaled overlay image data and the main image data define corresponding overlay image pixels and main image pixels respectively, wherein said overlay image pixels are either transparent or opaque, and wherein said step of combining includes
    (a) selecting said overlay image pixels and not the corresponding said main image pixels where said overlay image pixels are opaque, and
    (b) selecting said main image pixels and not the corresponding said overlay image pixels where said overlay image pixels are transparent.

15. The method of claim 11, further comprising resizing the main image data prior to said step of combining.

16. The method of claim 11, further comprising converting the main image data from one color format to another color format prior to said step of combining.

17. The method of claim 16, further comprising resizing the main image data prior to said step of combining.

18. The method of claim 17, further comprising transmitting said composite image data to a display device having a display screen.

19. The method of claim 18, further comprising storing the transmitted said composite image data in a memory in said display device.

20. The method of claim 11, further comprising transmitting said composite image data to a display device having a display screen.

21. The method of claim 20, further comprising storing the transmitted said composite image data in a memory in said display device.

22. A graphics controller for overlaying overlay image data received from an overlay image source over main image data received from a main image source, comprising:
    a memory to store the overlay image data;
    a fetching module to fetch the overlay image data from the memory;
    a scaling circuit to scale the fetched overlay image data according to a methodology that changes at least one dimension of an image; and a combining circuit to combine the fetched, up-scaled overlay image data with the main image data to form composite image data.

23. The graphics controller of claim 22, where the up-scaled overlay image data and the main image data define corresponding overlay image pixels and main image pixels respectively, wherein said overlay image pixels are either transparent or opaque, and wherein said combining circuit is adapted for
 (a) selecting said overlay image pixels and not the corresponding said main image pixels where said overlay image pixels are opaque, and
 (b) selecting said main image pixels and not the corresponding said overlay image pixels where said overlay image pixels are transparent.

24. The graphics controller of claim 22, further comprising a resizer for resizing the main image data provided to said combining circuit.

25. The graphics controller of claim 22, further comprising a color format converter for converting the main image data from one color format to another color format.

26. The graphics controller of claim 25, further comprising a resizer for resizing the main image data provided to said combining circuit.

27. The graphics controller of claim 26, further comprising a display interface for transmitting said composite image data to a display device having a display screen.

28. The graphics controller of claim 22, further comprising a display interface for transmitting said composite image data to a display device having a display screen.

29. The graphics controller of claim 28, where the up-scaled overlay image data and the main image data define corresponding overlay image pixels and main image pixels respectively, wherein said overlay image pixels are either transparent or opaque, and wherein said combining circuit is adapted for
 (a) selecting said overlay image pixels and not the corresponding said main image pixels where said overlay image pixels are opaque, and
 (b) selecting said main image pixels and not the corresponding said overlay image pixels where said overlay image pixels are transparent.

30. The graphics controller of claim 29, further comprising a resizer for resizing the main image data provided to said combining circuit.

31. The graphics controller of claim 29, further comprising a color format converter for converting the main image data from one color format to another color format.

32. The graphics controller of claim 31, further comprising a resizer for resizing the main image data provided to said combining circuit.

33. A graphics controller for overlaying overlay image data received from an overlay image source over main image data received from a main image source, comprising:
 a main image data interface to receive the main image data, the main image data being transmitted according to a streaming process that continuously transmits all of the main image data at a particular rate;
 a memory to store the overlay image data;
 a fetching module to fetch the overlay image data from the memory synchronously with the receipt of the main image data; and
 a combining unit to receive the main image data from the main image data interface and the overlay image data from the fetching module, and to combine the fetched overlay image data with the streamed main image data to form composite image data.

34. The graphics controller of claim 33, further comprising a scaling circuit to up-scale the fetched overlay image data provided to the combining unit according to a methodology that changes at least one dimension of an image.

35. The graphics controller of claim 34, where the up-scaled overlay image data and the main image data define corresponding overlay image pixels and main image pixels respectively, wherein said overlay image pixels are either transparent or opaque, and wherein said combining circuit is adapted for
 (a) selecting said overlay image pixels and not the corresponding said main image pixels where said overlay image pixels are opaque, and
 (b) selecting said main image pixels and not the corresponding said overlay image pixels where said overlay image pixels are transparent.

36. The graphics controller of claim 33, further comprising a resizer for resizing the main image data provided to said combining circuit.

37. The graphics controller of claim 33, further comprising a color format converter for converting the main image data from one color format to another color format.

38. The graphics controller of claim 37, further comprising a resizer for resizing the main image data provided to said combining circuit.

39. The graphics controller of claim 38, further comprising a display interface for transmitting said composite image data to a display device having a display screen.

40. The graphics controller of claim 33, further comprising a display interface for transmitting said composite image data to a display device having a display screen.

41. The graphics controller of claim 40, further comprising a scaling circuit to up-scale the fetched overlay image data provided to the combining unit according to a methodology that changes at least one dimension of an image, where the up-scaled overlay image data and the main image data define corresponding overlay image pixels and main image pixels respectively, wherein said overlay image pixels are either transparent or opaque, and wherein said combining circuit is adapted for
 (a) selecting said overlay image pixels and not the corresponding said main image pixels where said overlay image pixels are opaque, and
 (b) selecting said main image pixels and not the corresponding said overlay image pixels where said overlay image pixels are transparent.

42. The graphics controller of claim 41, further comprising a resizer for resizing the main image data provided to said combining circuit.

43. The graphics controller of claim 41, further comprising a color format converter for converting the main image data from one color format to another color format.

44. The graphics controller of claim 43, further comprising a resizer for resizing the main image data provided to said combining circuit.

45. A system for overlaying overlay image data received from an overlay image source over main image data received from a main image source comprising:
 a source of main image data;
 a source of overlay image data;
 a display device having a display screen; and
 a graphics controller comprising:
  a memory to store the overlay image data;
  a fetching module to fetch the overlay image data from the memory;

a scaling circuit to scale the fetched overlay image data according to a methodology that changes at least one dimension of an image; and a combining circuit to combine the fetched, up-scaled overlay image data with the main image data to form composite image data.

46. The system of claim 45, where the up-scaled overlay image data and the main image data define corresponding overlay image pixels and main image pixels respectively, wherein said overlay image pixels are either transparent or opaque, and wherein said combining circuit is adapted for
   (a) selecting said overlay image pixels and not the corresponding said main image pixels where said overlay image pixels are opaque, and
   (b) selecting said main image pixels and not the corresponding said overlay image pixels where said overlay image pixels are transparent.

47. The system of claim 45, wherein said graphics controller includes a resizer for resizing the main image data provided to said combining circuit.

48. The system of claim 45, wherein said graphics controller includes a color format converter for converting the main image data from one color format to another color format.

49. The system of claim 48, wherein said graphics controller includes a resizer for resizing the main image data provided to said combining circuit.

50. The system of claim 49, wherein said graphics controller includes a display interface for transmitting said composite image data to the display device.

51. The system of claim 50, wherein said display device includes a memory for storing said composite image data.

52. The system of claim 45, wherein said graphics controller includes a display interface for transmitting said composite image data to the display device.

53. The system of claim 52, wherein said display device includes a memory for storing said composite image data.

54. The system of claim 53, where the up-scaled overlay image data and the main image data define corresponding overlay image pixels and main image pixels respectively, wherein said overlay image pixels are either transparent or opaque, and wherein said combining circuit is adapted for
   (a) selecting said overlay image pixels and not the corresponding said main image pixels where said overlay image pixels are opaque, and
   (b) selecting said main image pixels and not the corresponding said overlay image pixels where said overlay image pixels are transparent.

55. The system of claim 54, wherein said graphics controller includes a resizer for resizing the main image data provided to said combining circuit.

56. The system of claim 54, wherein said graphics controller includes a color format converter for converting the main image data from one color format to another color format.

57. The system of claim 56, wherein said graphics controller includes a resizer for resizing the main image data provided to said combining circuit.

58. The system of claim 54, wherein said source of main image data includes a camera.

59. The system of claim 54, wherein said source of main image data includes a host CPU.

60. The system of claim 59, wherein the host CPU is adapted to down-scale the overlay image data provided to the memory according to a methodology that changes at least one dimension of an image.

61. A system comprising:
   a source of main image data;
   a source of overlay image data;
   a display device having a display screen; and
   a graphics controller comprising:
      a main image data interface to receive the main image data, the main image data being transmitted according to a streaming process that continuously transmits all of the main image data at a particular rate,
      a memory to store the overlay image data,
      a fetching module to fetch the overlay image data from the memory synchronously with the receipt of the main image data, and
      a combining unit to receive the main image data from the main image data interface and the overlay image data from the fetching module to combine the fetched overlay image data with the streamed main image data to form composite image data.

62. The system of claim 61, wherein said graphics controller includes a scaling circuit for up-scaling the fetched overlay image data according to a methodology that changes at least one dimension of an image provided to said combining circuit.

63. The system of claim 62, where the up-scaled overlay image data and the main image data define corresponding overlay image pixels and main image pixels respectively, wherein said overlay image pixels are either transparent or opaque, and wherein said combining circuit is adapted for
   (a) selecting said overlay image pixels and not the corresponding said main image pixels where said overlay image pixels are opaque, and
   (b) selecting said main image pixels and not the corresponding said overlay image pixels where said overlay image pixels are transparent.

64. The system of claim 61, wherein said graphics controller includes a resizer for resizing the main image data provided to said combining circuit.

65. The system of claim 61, wherein said graphics controller includes a color format converter for converting the main image data from one color format to another color format.

66. The system of claim 65, wherein said graphics controller includes a resizer for resizing the main image data provided to said combining circuit.

67. The system of claim 66, wherein said graphics controller includes a display interface for transmitting said composite image data to the display device.

68. The system of claim 67, wherein said display device includes a memory for storing said composite image data.

69. The system of claim 61, wherein said graphics controller includes a display interface for transmitting said composite image data to the display device.

70. The system of claim 69, wherein said display device includes a memory for storing said composite image data.

71. The system of claim 70, wherein said graphics controller includes a scaling circuit for up-scaling the fetched overlay image data provided to said combining circuit according to a methodology that changes at least one dimension of an image, where the up-scaled overlay image data and the main image data define corresponding overlay image pixels and main image pixels respectively, wherein said overlay image pixels are either transparent or opaque, and wherein said combining circuit is adapted for (a) selecting said overlay image pixels and not the corresponding said main image pixels where said overlay image pixels are opaque, and
(b) selecting said main image pixels and not the corresponding said overlay image pixels where said overlay image pixels are transparent.

72. The system of claim 71, wherein said graphics controller includes a resizer for resizing the main image data provided to said combining circuit.

73. The system of claim 71, wherein said graphics controller includes a color format converter for converting the main image data from one color format to another color format.

74. The system of claim 73, wherein said graphics controller includes a resizer for resizing the main image data provided to said combining circuit.

75. The system of claim 71, wherein said source of main image data includes a camera.

76. The system of claim 71, wherein said source of main image data includes a host CPU.

77. The system of claim 76, wherein said host CPU down-scales the overlay image data provided to the memory according to the methodology that changes at least one dimension of the image.

* * * * *

UNITED STATES PATENT AND TRADEMARK OFFICE
CERTIFICATE OF CORRECTION

| | | |
|---|---|---|
| PATENT NO. | : 7,221,378 B2 | Page 1 of 1 |
| APPLICATION NO. | : 10/802578 | |
| DATED | : May 22, 2007 | |
| INVENTOR(S) | : Atousa Soroushi et al. | |

It is certified that error appears in the above-identified patent and that said Letters Patent is hereby corrected as shown below:

<u>Column 10,</u>
Line 1, please change "A system comprising:" to --A system for overlaying overlay image data received from an overlay image source over main image data received from a main image source, comprising:--

Signed and Sealed this

Third Day of June, 2008

JON W. DUDAS
*Director of the United States Patent and Trademark Office*